US00RE39237E

(19) United States
(12) Reissued Patent
Cho et al.

(10) Patent Number: US RE39,237 E
(45) Date of Reissued Patent: Aug. 15, 2006

(54) INTERPOLATION METHOD FOR BINARY IMAGE

(75) Inventors: Dae-sung Cho, Seoul (KR); Jae-seob Shin, Seoul (KR)

(73) Assignee: Samsung Electronics Co., Ltd., Suwon-si (KR)

(21) Appl. No.: 10/012,527

(22) Filed: Dec. 12, 2001

Related U.S. Patent Documents

Reissue of:
(64) Patent No.: 6,002,813
Issued: Dec. 14, 1999
Appl. No.: 09/087,278
Filed: May 29, 1998

U.S. Applications:
(63) Continuation of application No. 08/979,107, filed on Nov. 26, 1997, now Pat. No. 6,002,812.

(30) Foreign Application Priority Data

Jul. 10, 1997 (KR) ..... 97-32102
Oct. 4, 1997 (KR) ..... 97-51105
Oct. 24, 1997 (KR) ..... 97-54869

(51) Int. Cl.
*G06K 9/32* (2006.01)

(52) U.S. Cl. ..... 382/300; 348/458; 348/625; 358/428; 358/525; 358/1.9; 382/272; 382/299; 382/270; 382/298

(58) Field of Classification Search ..... 382/298, 382/299, 300, 270, 272; 348/441, 458, 625; 358/428, 525
See application file for complete search history.

(56) References Cited

U.S. PATENT DOCUMENTS 4,771,471 A * 9/1988 Kitamura ..... 382/269
5,054,100 A * 10/1991 Tai ..... 382/300
5,754,706 A * 5/1998 Schweid et al. ..... 382/252
5,799,113 A * 8/1998 Lee ..... 382/256
5,805,305 A * 9/1998 Abe ..... 358/457
5,818,964 A * 10/1998 Itoh ..... 382/205
5,832,143 A * 11/1998 Suga et al. ..... 382/300
6,088,489 A 7/2000 Miyake

FOREIGN PATENT DOCUMENTS

JP 4199477 7/1992
JP 7182503 7/1995
JP A-7-182503 7/1995
JP 8116430 5/1996
JP A-8-116430 5/1996

OTHER PUBLICATIONS

Sikora, T., *The MPEG–4 Video Standard Verification Model*, IEEE Transactions on Circuits and Systems for Video Technology, vol. 7, No. 1, Feb. 1997, pp. 19–31.

Office Action issued by the Japanese Patent Office on Feb. 24, 2004 in connection with corresponding application.

* cited by examiner

*Primary Examiner*—Bhavesh M. Mehta
*Assistant Examiner*—Gregory Desire
(74) *Attorney, Agent, or Firm*—Buchanan Ingersoll PC

(57) ABSTRACT

An improved interpolation method in which a threshold value used for determining a pixel value of a pixel generated by interpolation according to a context which is a state value of adjacent pixels. In the interpolation method, the ambiguity between the interpolation value and the threshold value is removed by using the context, thereby reducing the blocking and smoothing phenomena in the restored binary image.

16 Claims, 11 Drawing Sheets

400 402 404

| CONTEXT | VARIABLE THRESHOLD VALUES | | | | | | | | | | | | | | | |
|---|---|---|---|---|---|---|---|---|---|---|---|---|---|---|---|---|
| [ 0, 15] | 5 | 6 | 6 | 8 | 6 | 7 | 7 | 8 | 6 | 5 | 7 | 6 | 8 | 8 | 8 | 8 |
| [ 16, 31] | 6 | 5 | 5 | 9 | 8 | 8 | 8 | 8 | 7 | 6 | 8 | 8 | 8 | 8 | 8 | 9 |
| [ 32, 47] | 6 | 7 | 5 | 8 | 7 | 9 | 8 | 8 | 7 | 8 | 8 | 8 | 8 | 8 | 8 | 9 |
| [ 48, 63] | 7 | 8 | 8 | 8 | 8 | 10 | 8 | 9 | 8 | 10 | 8 | 11 | 8 | 11 | 9 | 10 |
| [ 64, 79] | 6 | 7 | 7 | 8 | 7 | 8 | 8 | 8 | 7 | 8 | 8 | 8 | 9 | 8 | 10 | 9 |
| [ 80, 95] | 7 | 8 | 8 | 8 | 8 | 7 | 8 | 9 | 8 | 10 | 8 | 9 | 8 | 11 | 9 | 10 |
| [ 96,111] | 7 | 8 | 8 | 10 | 8 | 10 | 10 | 11 | 8 | 8 | 10 | 9 | 10 | 11 | 11 | 10 |
| [112,127] | 8 | 8 | 8 | 11 | 8 | 9 | 11 | 12 | 8 | 9 | 11 | 12 | 11 | 12 | 10 | 11 |
| [128,143] | 6 | 7 | 7 | 9 | 7 | 6 | 8 | 8 | 5 | 8 | 8 | 8 | 6 | 8 | 10 | 9 |
| [144,159] | 8 | 8 | 8 | 10 | 8 | 10 | 8 | 9 | 8 | 10 | 10 | 11 | 10 | 11 | 9 | 10 |
| [160,175] | 8 | 8 | 6 | 10 | 8 | 8 | 10 | 9 | 8 | 8 | 10 | 9 | 8 | 9 | 9 | 10 |
| [176,191] | 9 | 8 | 10 | 11 | 8 | 13 | 9 | 10 | 10 | 11 | 11 | 14 | 11 | 12 | 10 | 11 |
| [192,207] | 7 | 8 | 8 | 8 | 8 | 8 | 8 | 9 | 8 | 8 | 8 | 9 | 8 | 9 | 10 | 11 |
| [208,223] | 9 | 8 | 8 | 9 | 8 | 11 | 9 | 10 | 10 | 11 | 9 | 10 | 11 | 12 | 10 | 11 |
| [224,239] | 8 | 8 | 8 | 11 | 10 | 11 | 11 | 10 | 8 | 11 | 9 | 12 | 11 | 12 | 14 | 11 |
| [240,255] | 10 | 9 | 11 | 12 | 11 | 12 | 12 | 11 | 9 | 12 | 12 | 13 | 12 | 13 | 11 | 14 |

406

FIG. 4

400 402 404

| CONTEXT | VARIABLE THRESHOLD VALUES | | | | | | | | | | | | | | | |
|---|---|---|---|---|---|---|---|---|---|---|---|---|---|---|---|---|
| [ 0, 15] | 5 | 6 | 6 | 8 | 6 | 7 | 7 | 8 | 6 | 5 | 7 | 6 | 8 | 8 | 8 | 8 |
| [ 16, 31] | 6 | 5 | 5 | 9 | 8 | 8 | 8 | 8 | 7 | 6 | 8 | 8 | 8 | 8 | 8 | 9 |
| [ 32, 47] | 6 | 7 | 5 | 8 | 7 | 9 | 8 | 8 | 7 | 8 | 8 | 8 | 8 | 8 | 8 | 9 |
| [ 48, 63] | 7 | 8 | 8 | 8 | 8 | 10 | 8 | 9 | 8 | 10 | 8 | 11 | 8 | 11 | 9 | 10 |
| [ 64, 79] | 6 | 7 | 7 | 8 | 7 | 8 | 8 | 8 | 7 | 8 | 8 | 8 | 9 | 8 | 10 | 9 |
| [ 80, 95] | 7 | 8 | 8 | 8 | 8 | 7 | 8 | 9 | 8 | 10 | 8 | 9 | 8 | 11 | 9 | 10 |
| [ 96,111] | 7 | 8 | 8 | 10 | 8 | 10 | 10 | 11 | 8 | 8 | 10 | 9 | 10 | 11 | 11 | 10 |
| [112,127] | 8 | 8 | 8 | 11 | 8 | 9 | 11 | 12 | 8 | 9 | 11 | 12 | 11 | 12 | 10 | 11 |
| [128,143] | 6 | 7 | 7 | 9 | 7 | 6 | 8 | 8 | 5 | 8 | 8 | 8 | 6 | 8 | 10 | 9 |
| [144,159] | 8 | 8 | 8 | 10 | 8 | 10 | 8 | 9 | 8 | 10 | 10 | 11 | 10 | 11 | 9 | 10 |
| [160,175] | 8 | 8 | 6 | 10 | 8 | 8 | 10 | 9 | 8 | 8 | 10 | 9 | 8 | 9 | 9 | 10 |
| [176,191] | 9 | 8 | 10 | 11 | 8 | 13 | 9 | 10 | 10 | 11 | 11 | 14 | 11 | 12 | 10 | 11 |
| [192,207] | 7 | 8 | 8 | 8 | 8 | 8 | 8 | 9 | 8 | 8 | 8 | 9 | 8 | 9 | 10 | 11 |
| [208,223] | 9 | 8 | 8 | 9 | 8 | 11 | 9 | 10 | 10 | 11 | 9 | 10 | 11 | 12 | 10 | 11 |
| [224,239] | 8 | 8 | 8 | 11 | 10 | 11 | 11 | 10 | 8 | 11 | 9 | 12 | 11 | 12 | 14 | 11 |
| [240,255] | 10 | 9 | 11 | 12 | 11 | 12 | 12 | 11 | 9 | 12 | 12 | 13 | 12 | 13 | 11 | 14 |

406

FIG. 5A

| SUM OF REFERENCE PIXEL VALUES | POSSIBLE INTERPOLATION VALUES |
|---|---|
| 0 | 0, 2, 4, 6, 8, 10 |
| 1 | 1, 3, 5, 7, 9, 11 |
| 2 | 2, 4, 6, 8, 10, 12 |
| 3 | 3, 5, 7, 9, 11, 13 |
| 4 | 4, 6, 8, 10, 12, 14 |
| 5 | 5, 7, 9, 11, 13, 15 |
| 6 | 6, 8, 10, 12, 14, 16 |
| 7 | 7, 9, 11, 13, 15, 17 |
| 8 | 8, 10, 12, 14, 16, 18 |

FIG. 5B

| SUM OF REFERENCE PIXEL VALUES | POSSIBLE CANDIDATE THRESHOLD VALUES |
|---|---|
| 0 | −1, 1, 3, 5, 7, 9, 11 |
| 1 | 0, 2, 4, 6, 8, 10, 12 |
| 2 | 1, 4, 5, 7, 9, 11, 13 |
| 3 | 2, 4, 6, 8, 10, 12, 14 |
| 4 | 3, 5, 7, 9, 11, 13, 15 |
| 5 | 4, 6, 8, 10, 12, 14, 16 |
| 6 | 5, 7, 9, 11, 13, 15, 17 |
| 7 | 6, 8, 10, 12, 16, 16, 18 |
| 8 | 7, 9, 11, 13, 15, 17, 19 |

FIG. 6

600 602 604

| CONTEXT | THRESHOLD VALUES SELECTING MEDIAN VALUES | | | | | | | | | | | | | | | |
|---|---|---|---|---|---|---|---|---|---|---|---|---|---|---|---|---|
| [ 0, 15] | 5 | 6 | 6 | 7 | 6 | 7 | 7 | 8 | 6 | 7 | 7 | 8 | 7 | 8 | 8 | 9 |
| [ 16, 31] | 6 | 5 | 7 | 8 | 7 | 8 | 8 | 9 | 7 | 8 | 8 | 9 | 8 | 9 | 9 | 10 |
| [ 32, 47] | 6 | 7 | 7 | 8 | 7 | 8 | 8 | 9 | 7 | 8 | 8 | 9 | 8 | 9 | 9 | 10 |
| [ 48, 63] | 7 | 8 | 8 | 9 | 8 | 9 | 9 | 10 | 8 | 9 | 9 | 10 | 9 | 10 | 10 | 11 |
| [ 64, 79] | 6 | 7 | 7 | 8 | 7 | 8 | 8 | 9 | 7 | 8 | 8 | 9 | 8 | 9 | 9 | 10 |
| [ 80, 95] | 7 | 8 | 8 | 9 | 8 | 9 | 9 | 10 | 8 | 9 | 9 | 10 | 9 | 10 | 10 | 11 |
| [ 96, 111] | 7 | 8 | 8 | 9 | 8 | 9 | 9 | 10 | 8 | 9 | 9 | 10 | 9 | 10 | 10 | 11 |
| [112, 127] | 8 | 9 | 9 | 10 | 9 | 10 | 10 | 11 | 9 | 10 | 10 | 11 | 10 | 11 | 11 | 12 |
| [128, 143] | 6 | 7 | 7 | 8 | 7 | 8 | 8 | 9 | 7 | 8 | 8 | 9 | 8 | 9 | 9 | 10 |
| [144, 159] | 7 | 8 | 8 | 9 | 8 | 9 | 9 | 10 | 8 | 9 | 9 | 10 | 9 | 10 | 10 | 11 |
| [160, 175] | 7 | 8 | 8 | 9 | 8 | 9 | 9 | 10 | 8 | 9 | 9 | 10 | 9 | 10 | 10 | 11 |
| [176, 191] | 8 | 9 | 9 | 10 | 9 | 10 | 10 | 11 | 9 | 10 | 10 | 11 | 10 | 11 | 11 | 12 |
| [192, 207] | 7 | 8 | 8 | 9 | 8 | 9 | 9 | 10 | 8 | 9 | 9 | 10 | 9 | 10 | 10 | 11 |
| [208, 223] | 8 | 9 | 9 | 10 | 9 | 10 | 10 | 11 | 9 | 10 | 10 | 11 | 10 | 11 | 11 | 12 |
| [224, 239] | 8 | 9 | 9 | 10 | 9 | 10 | 10 | 11 | 9 | 10 | 10 | 11 | 10 | 11 | 11 | 12 |
| [240, 255] | 9 | 10 | 10 | 11 | 10 | 11 | 11 | 12 | 10 | 11 | 11 | 12 | 11 | 12 | 12 | 13 |

606

FIG. 7

| CONTEXT | VARIABLE THRESHOLD VALUES BASED ON LIMITED RANGE | | | | | | | | | | | | | | | |
|---|---|---|---|---|---|---|---|---|---|---|---|---|---|---|---|---|
| [ 0, 15] | 3 | 6 | 6 | 7 | 4 | 7 | 7 | 8 | 6 | 7 | 5 | 8 | 7 | 8 | 8 | 9 |
| [ 16, 31] | 6 | 5 | 5 | 8 | 5 | 6 | 8 | 9 | 7 | 6 | 8 | 9 | 8 | 7 | 9 | 10 |
| [ 32, 47] | 6 | 7 | 7 | 8 | 7 | 8 | 8 | 9 | 7 | 10 | 8 | 9 | 8 | 9 | 9 | 10 |
| [ 48, 63] | 7 | 8 | 6 | 9 | 6 | 9 | 9 | 10 | 8 | 9 | 9 | 10 | 11 | 10 | 10 | 11 |
| [ 64, 79] | 6 | 9 | 5 | 8 | 5 | 6 | 8 | 9 | 7 | 10 | 10 | 9 | 8 | 7 | 9 | 10 |
| [ 80, 95] | 7 | 6 | 8 | 9 | 8 | 7 | 7 | 10 | 8 | 9 | 9 | 10 | 9 | 8 | 10 | 9 |
| [ 96, 111] | 7 | 8 | 8 | 9 | 6 | 9 | 9 | 10 | 8 | 9 | 9 | 10 | 9 | 10 | 10 | 9 |
| [112, 127] | 8 | 9 | 11 | 10 | 7 | 10 | 10 | 11 | 9 | 12 | 10 | 11 | 10 | 11 | 11 | 12 |
| [128, 143] | 6 | 7 | 5 | 8 | 5 | 6 | 8 | 9 | 5 | 6 | 6 | 9 | 8 | 9 | 9 | 10 |
| [144, 159] | 5 | 8 | 8 | 9 | 6 | 7 | 9 | 10 | 6 | 7 | 9 | 10 | 9 | 10 | 10 | 11 |
| [160, 175] | 7 | 8 | 6 | 9 | 8 | 9 | 9 | 10 | 8 | 7 | 9 | 10 | 9 | 10 | 10 | 11 |
| [176, 191] | 8 | 9 | 7 | 10 | 9 | 10 | 8 | 11 | 9 | 10 | 10 | 11 | 10 | 11 | 9 | 12 |
| [192, 207] | 7 | 8 | 6 | 9 | 8 | 9 | 9 | 10 | 10 | 9 | 7 | 10 | 9 | 10 | 10 | 11 |
| [208, 223] | 8 | 7 | 7 | 10 | 7 | 8 | 8 | 9 | 9 | 10 | 10 | 11 | 10 | 11 | 11 | 12 |
| [224, 239] | 8 | 9 | 9 | 10 | 9 | 10 | 10 | 9 | 9 | 10 | 10 | 11 | 10 | 11 | 11 | 12 |
| [240, 255] | 9 | 10 | 10 | 11 | 10 | 11 | 11 | 12 | 10 | 11 | 11 | 12 | 11 | 12 | 12 | 13 |

INTERPOLATION METHOD FOR BINARY IMAGE

Matter enclosed in heavy brackets [ ] appears in the original patent but forms no part of this reissue specification; matter printed in italics indicates the additions made by reissue.

This is a continuation of U.S. patent application Ser. No. 08/979,107, filed Nov. 26, 1997, *now U.S. Pat. No. 6,002,812,* and claims priority to Korean Patent Application Nos. 97-32102, 97-51105, and 97-54869 filed in Korea on Jul. 10, 1997, Oct. 4, 1997, and Oct. 24, 1997, respectively, all of which are herein incorporated by reference.

BACKGROUND OF THE INVENTION

1. Field of the Invention

The present invention relates to an interpolation method for a binary image, and more particularly, to an improved interpolation method in which a variable threshold value used for determining a pixel value to be generated by interpolation is determined according to a context (the state value of adjacent pixels). This invention has been adopted in ISO/IEC JTC1/SC29/WG11 N1903 (ISO/IEC 14496-2 (Subpart 7 Committee Draft).

2. Description of the Related Art

Recently, a function for processing shape information has been added to MPEG-4. The shape information, which refers to object information of the image, is expressed as a binary image. To code such a binary image, MPEG-4 adopts a context-based arithmetic encoder (CAE). For lossy shape coding a down sampling method and an up sampling method are performed in each macro block of binary shape. A shape image is divided into shape blocks having an M×M size.

The down sampling refers to a method for reducing the binary image block according to a given conversion ratio. The reduced image block is transmitted together with the conversion ratio. Here, the conversion ratio is determined such that an error between the original binary image block and an binary image block restored later is within a predetermined range.

The reduced image block obtained by the down sampling is coded by a CAE and then transmitted.

The up sampling method is used to restore such a reduced image block. Up sampling is for restoring the reduced image block into block with the size of the original binary image block, by interpolation.

In such an up sampling process, an effective interpolation method must not cause excessive blocking and smoothing effects in the restored binary image.

SUMMARY OF THE INVENTION

To satisfy the above requirement, it is an object of the present invention to provide an improved interpolation method in which a context (state value of reference pixels adjacent to a pixel (interpolated pixel) generated by interpolation) is used for interpolation, thereby reducing blocking and smoothing effects.

To achieve the above object, there is provided an interpolation method for a binary image, for restoring a binary image block reduced through a down sampling into the block with the size of original binary image block, the method comprising the steps of: (a) preparing a threshold table showing various threshold values corresponding to a context $C_p$ (state value) of pixels (reference pixels) of the reduced image, around an interpolated pixel; (b) calculating an interpolation value based on the pixel values of pixels (object pixels) adjacent and/or around the interpolated pixel; (c) calculating the context $C_p$ which is the state value of the reference pixels around the interpolated pixel; (d) obtaining a threshold value corresponding to the calculated context from the threshold table; and (e) comparing the interpolation value with the threshold value of the step (d), and setting the pixel value of the interpolated pixel as "1" if the interpolation value is greater than the threshold value, and setting the pixel value of the interpolated pixel as "0" if the interpolation value is equal to or less than the threshold value.

Preferably, the step (a) comprises the sub-steps of: (a1) calculating possible sums of the reference pixels; (a2) calculating possible interpolation values with respect to the possible sums of the reference pixels; (a3) setting candidate threshold values with respect to the possible sum of the reference pixels; and (a4) selecting a threshold value from the candidate threshold values with respect to each context corresponding to the possible sum of the reference pixels, resulting in the threshold table.

The invention may be embodied in a general purpose digital computer that is running a program from a computer usable medium including but not limited to storage media such as magnetic storage media (e.g., ROM's, floppy disks, hard disks, etc.), optically readable media (e.g., CD-ROMs, DVDs, etc.), hybrid formats (magneto optical disks) and carrier waves (e.g., transmissions over the Internet). For instance, a part of the present invention can be computer usable medium having computer readable program code means embodied therein for processing by a machine, the computer usable medium having embodied thereon a computer program for restoring a binary image block reduced through a down sampling into the block with the size of the original binary image block, the computer program being executable by the machine to perform:

(a) preparing a threshold table showing various threshold values corresponding to a context $C_p$ (state value) of pixels (reference pixels) of the reduced image, around an interpolated pixel;

(b) calculating an interpolation value based on the pixel values of pixels (object pixels) adjacent to and/or around the interpolated pixel;

(c) calculating the context $C_p$ which is the state value of the reference pixels around the interpolated pixel;

(d) obtaining a threshold value corresponding to the calculated context from the threshold table; and (e) comparing the interpolation value with the threshold value of the step (d), and setting the pixel value of the interpolated pixel as "1" if the interpolation value is greater than the threshold value, and setting the pixel value of the interpolated pixel as "0" if the interpolation value is equal to or less than the threshold value.

BRIEF DESCRIPTION OF THE DRAWINGS

The above object and advantages of the present invention will become more apparent by describing in detail a preferred embodiment thereof with reference to the attached drawings in which:

FIG. 4 shows an example of a threshold value table;

FIG. 5A is a table showing the relationship between sum of reference pixel values and possible interpolation values;

FIG. 5B is a table showing an example of possible candidate threshold values with respect to the possible sum of the reference pixels;

FIG. 6 is a table showing the median selected among the candidate threshold values of FIG. 5B according to possible combinations of context;

FIG. 7 is a threshold table, which is prepared in consideration of a limited range of the threshold value shown in FIG. 6, according to the possible combinations of context.

DESCRIPTION OF THE PREFERRED EMBODIMENT

Figure 1A:
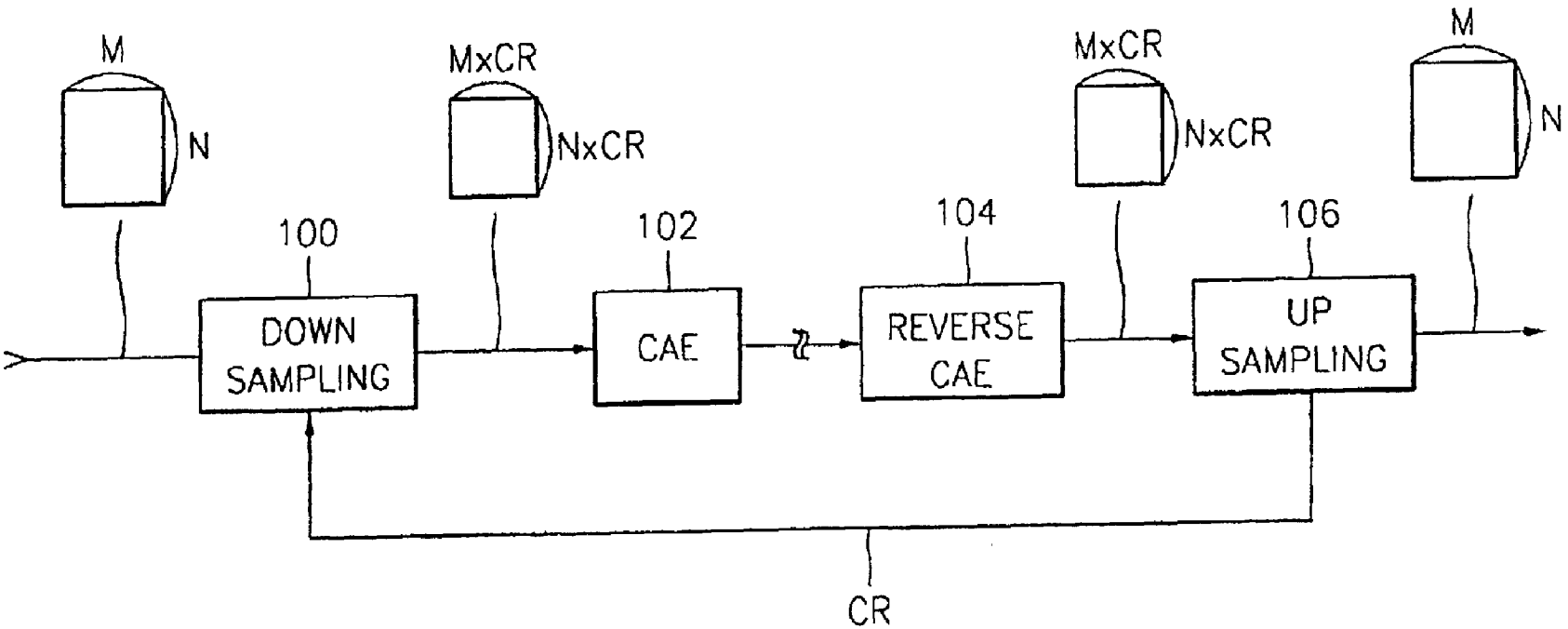
FIG. 1A is a diagram illustrating coding and decoding methods for a binary image according to the MPEG-4.

In FIG. 1A, coding and decoding methods for a binary image having object information according to the MPEG-4 includes a down sampling step 100, a coding step 102, a reverse coding step 104 and an up sampling step 106.

In the down sampling step 100, an M×N binary image block is converted into an (M×Cr)×(N×CR) binary image block. Here, CR is a conversion ratio indicating the ratio in size of the reduced image block obtained by the down sampling with respect to the original binary image block.

In the coding step 102, the reduced image is encoded. In order to code the binary image including objects, MPEG-4 adopts a context-based arithmetic encoder (CAE). The CAE is adopted as a coding method in the verification model of MPEG-4, due to its simplicity and comparatively high coding efficiency.

The reduced image coded through the coding step 102 is transmitted via a transmission route. In the reverse coding step 104, the coded reduced image is restored into the reduced image. In the up sampling step 106, the interpolation is performed on the reduced image block to obtain the block with the size of the original binary image.

Figure 1B:
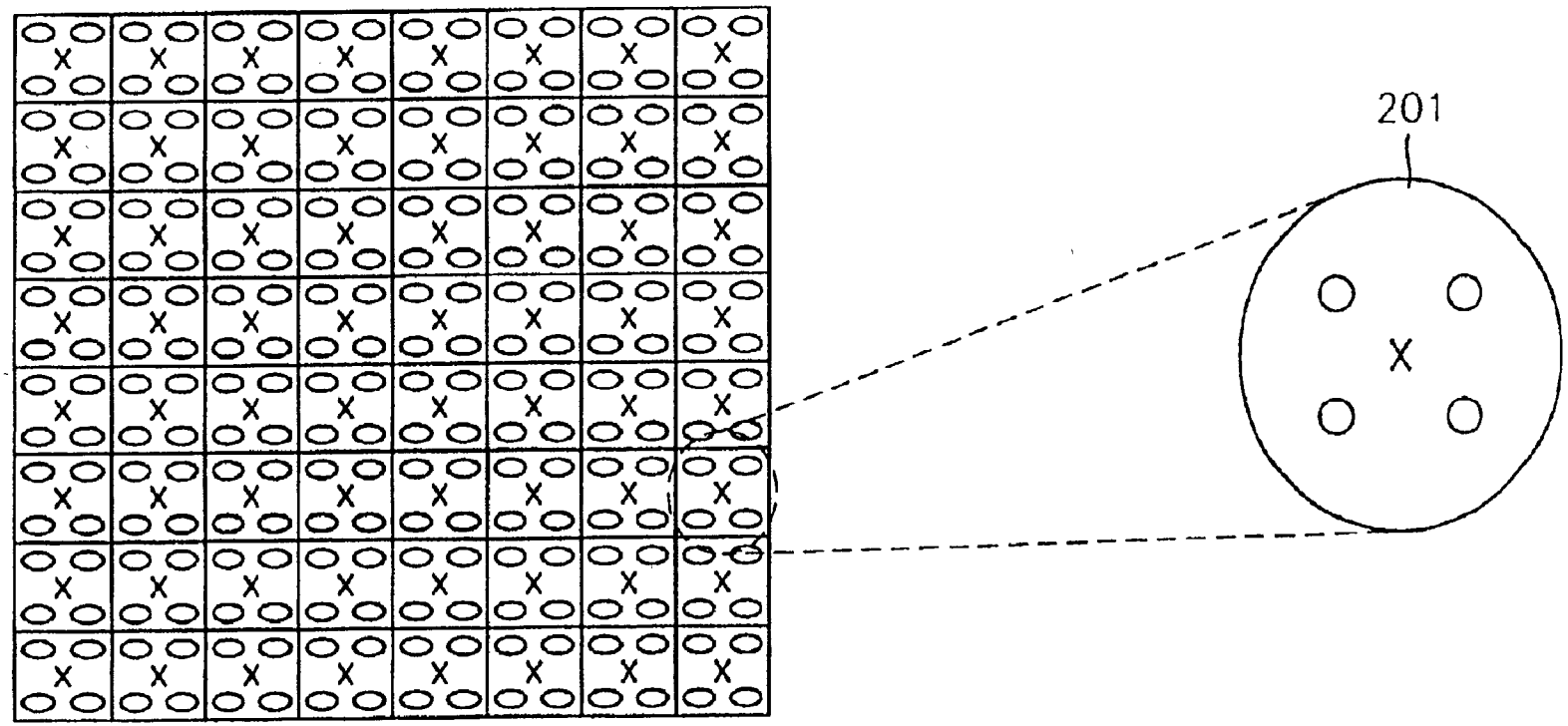
FIG. 1B is a shape macro block in which a down sampling step shown in FIG. 1A is performed.

FIG. 1B illustrates in detail the down sampling step 100 shown in FIG. 1A. A macro block of a binary image is shown in FIG. 1B, where the circles indicated by a character "O" correspond to the binary pixels. As can be seen from the circle of FIG. 1B, pixels indicated by a character "O" within the macro block are converted into pixels indicated by a character "X". Here, the size of the macro block is determined depending on the conversion ratio. The conversion ratio of MPEG-4 may be 1, ¼ or 1/16. Such conversion is performed on all macro blocks, resulting in a reduced image. In FIG. 1B, four pixels (indicated by "O") of a macro block are reduced to a pixel (indicated by "X") as in 201, that is, the conversion ratio is equal to ¼.

In the down sampling step, if half or more pixels of four pixels (indicated by "O") are equal to "1", the pixel value of the converted pixel (indicated by "X") becomes "1". Here, pixels having value "1" represent a part of the picture containing an object, and pixels having value "O" represent a part of the picture outside an object. The macro block including both pixels having value "1" and pixels having value "0" represents the boundary block of the object information. The pixel values are assigned arbitrarily and though convention. The values can, of course, be reversed.

Figure 1C:
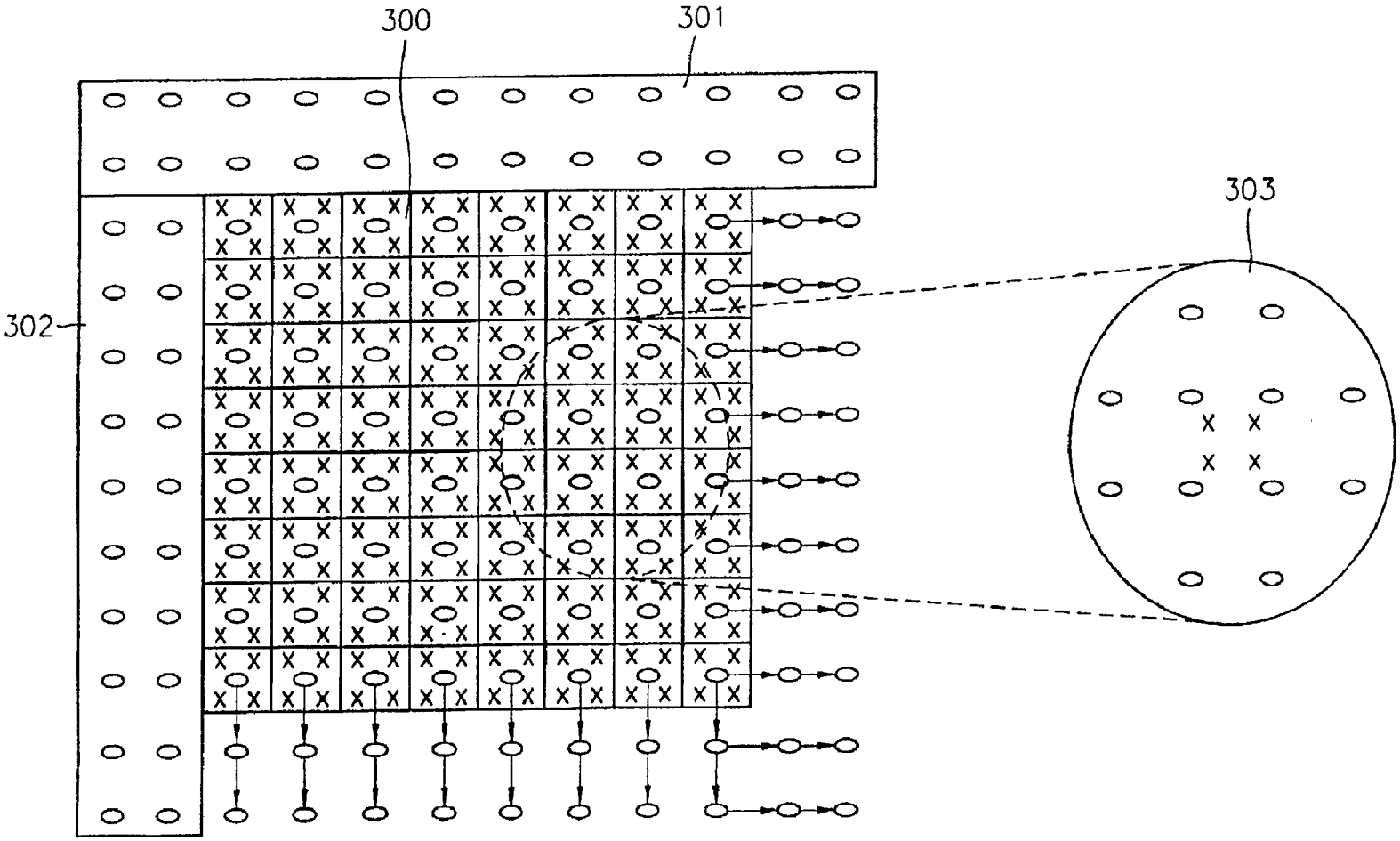
FIG. 1C is a shape macro block in which an up sampling step shown in FIG. 1A is performed.

FIG. 1C illustrates in detail the up sampling step 106 shown in FIG. 1A. During the up sampling step, each pixel of the macro block with the size of original binary block is restored by the interpolation using pixels of the reduced image block. In FIG. 1C, pixels indicated by "X" represent the pixels of the restored shape block, and pixels indicated by "O" represents the pixels of the reduced shape block.

Basically, pixels (indicated by "X") of a restored shape block 300 are obtained from the neighboring pixels (indicated by "O") of the reduced shape macro block as shown in the circle 303 of FIG. 1C.

For example, pixels of an upper border 301 and a left border 302 are referred to as down-sampled pixels which belong to the upper macro block and left macro block, respectively.

When the pixels of lower boundary and right boundary of macro block 300 refer to the neighboring pixels outside the block 300, the pixels outside the block can be obtained by extending the outermost pixels inside the block as shown in FIG. 1C.

Figure 2:
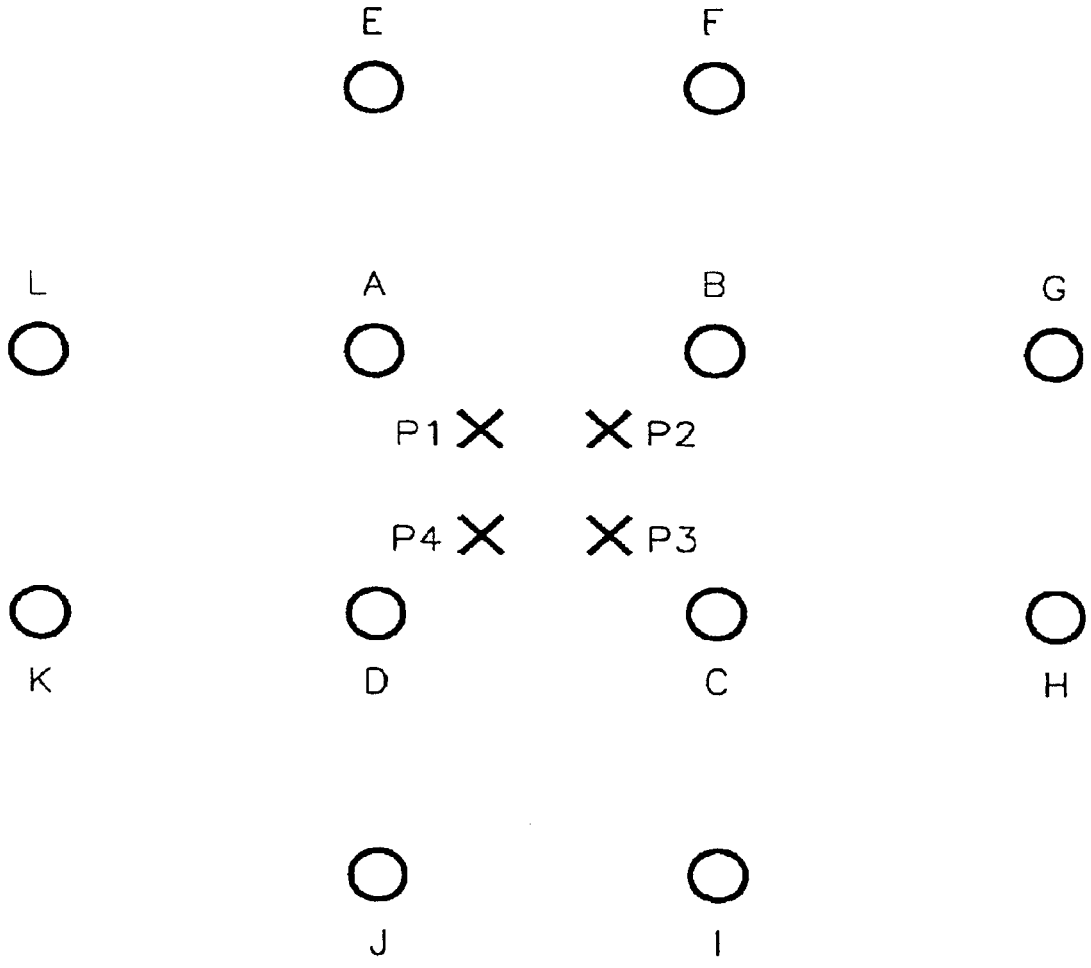
FIG. 2 (PRIOR ART)
FIG. 2 is a diagram illustrating a conventional interpolation method.

Referring to FIG. 2, a conventional interpolation method will be described in detail.

In FIG. 2, pixels A, B, C, D, E, F, G, H, I, J, K and L represent object pixels concerned in the interpolation; and pixels P1, P2, P3 and P4 represents interpolated pixels obtained by the interpolation. Here, object pixels A, B, C, D, E, F, G, H, I, J, K and L surround the interpolated pixels P1, P2, P3 and P4. Also, object pixels belong to the reduced image while the interpolated pixels belong to the restored binary image.

First, an interpolation value INP[P] is obtained as follows:

$$INP[P1]=r*A+s*(B+C+D)+t*(E+F+G+H+I+J+K+L)$$

$$INP[P2]=r*B+s*(A+C+D)+t*(E+F+G+H+I+J+K+L)$$

$$INP[P3]=r*C+s*(A+B+D)+t*(E+F+G+H+I+J+K+L)$$

$$INP[P4]=r*D+s*(A+B+C)+t*(E+F+G+H+I+J+K+L)$$

where r, s and t are weights according to the distance from the interpolated pixel, that is, r is the weight of the object pixel which is the closest to the interpolated pixel, s is the weight of object pixels which are the next closest to the interpolated pixel, and t is the weight of object pixels around the next closest pixels. Also, the condition of r>s>t is satisfied.

Next, the obtained interpolation value INP[P]and a threshold value THR are compared. Here, the threshold value THR is set to a value which is half of the largest possible interpolation value. For example, if r, s and t are 4, 2 and 1, respectively, then the threshold value is set to 9. If the interpolation value INP[P] is greater than the threshold value THR, the pixel value of the interpolated pixel becomes "1". Otherwise, the pixel value of the interpolated pixel becomes "0".

Here, only one threshold THR is applied while a plurality of interpolation values INP may be applied. Thus, if the interpolation value INP[P] and the threshold value THR are close to each other, it is unclear whether the pixel value of the interpolated pixel is correct or not. Accordingly, serious blocking or smoothing phenomenon can be present in the restored binary image.

To reduce the blocking or smoothing effects, a threshold value to be compared with the interpolation value INP[P] is adaptively determined according to the context (state values of the pixels (reference pixels) around the interpolated pixel), thereby reducing ambiguity in determination of the pixel value of the interpolated pixel.

An improved interpolation method according to a preferred embodiment of the present invention will be described with reference to FIGS. 3A through 3D. In FIGS. 3A through 3D, pixels A, B, C, D, E, F, G, H, I, J, K and L indicated by "O" represents object pixels belonging to the reduced image, and pixels E, F, G, H, I, J, K and L represent reference pixels, and pixels P1, P2, P3 and P4 indicated by "X" represent the interpolated pixels of the restored binary image.

First, an interpolation value INP[P] is obtained by the object pixels as follows:

$$INP[P1]=r*A+s*(B+C+D)+t*(E+F+G+H+I+J+K+L)$$

$$INP[P2]=r*B+s*(A+C+D)+t*(E+F+G+H+I+J+K+L)$$

$$INP[P3]=r*C+s*(A+B+D)+t*(E+F+G+H+I+J+K+L)$$

$$INP[P4]=r*D+s*(A+B+C)+t*(E+F+G+H+I+J+K+L)$$

where r, s and t are weights according to the distance from the interpolated pixel, that is, r is the weight of the object pixel which is the closest to the interpolated pixel, s is the weight of object pixels which are the next closest to the interpolated pixel, and t is the weight of object pixels around the next closest pixels. Also, the condition of r>s>t is satisfied. Here, r, s and t are 4, 2 and 1, respectively.

Then, the context $C_p$ which is state value of the reference pixels is calculated by the following equation (1):

$$C_p = \sum_{0}^{k} O_k \cdot 2^k \tag{1}$$

where P represents the position of the interpolated pixel, O represents the reference pixel, and k is an index of the reference pixels and also a weight. Here, the index k is varied depending on the relative position between the interpolated pixel and the adjacent object pixels. FIGS. 3A through 3D shows index of the reference pixels when interpolating the interpolated pixels P1, P2, P3 and P4.

Next, a threshold value THRc according to the calculated context is determined with reference to the threshold value table shown in FIG. 4. The threshold value of FIG. 4 is experimentally obtained by comparing the original image and the restored binary image such that a restoration error is minimized.

In the threshold table of FIG. 4, the context values are arranged in the left column according to size in units of 16, and threshold values corresponding to each context value are arranged in each row.

Since the number of the reference pixels for calculating context is 8, the number of potential combinations become 256.

Figure 3A:
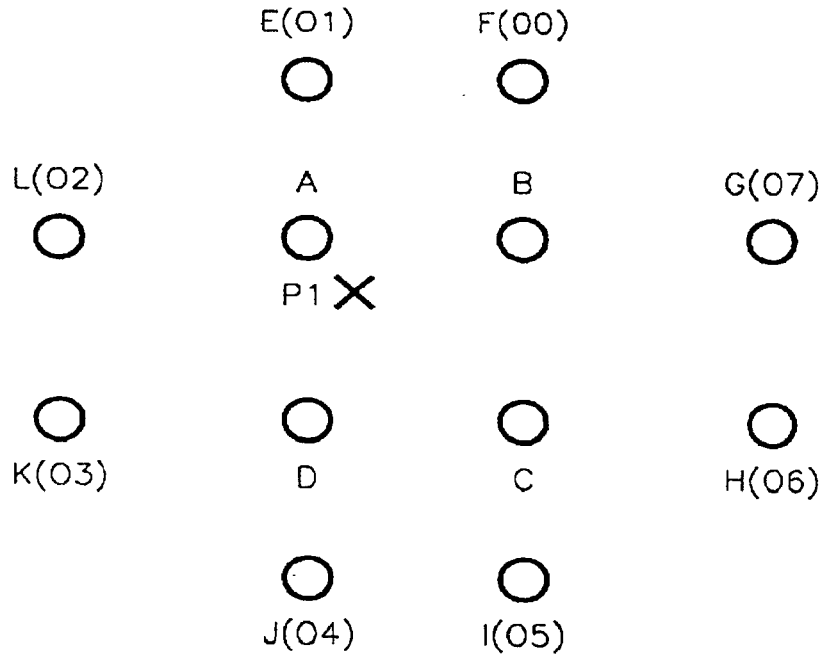
FIGS. 3A through 3D are diagram illustrating an interpolation method according to the present invention.
Figure 3B:
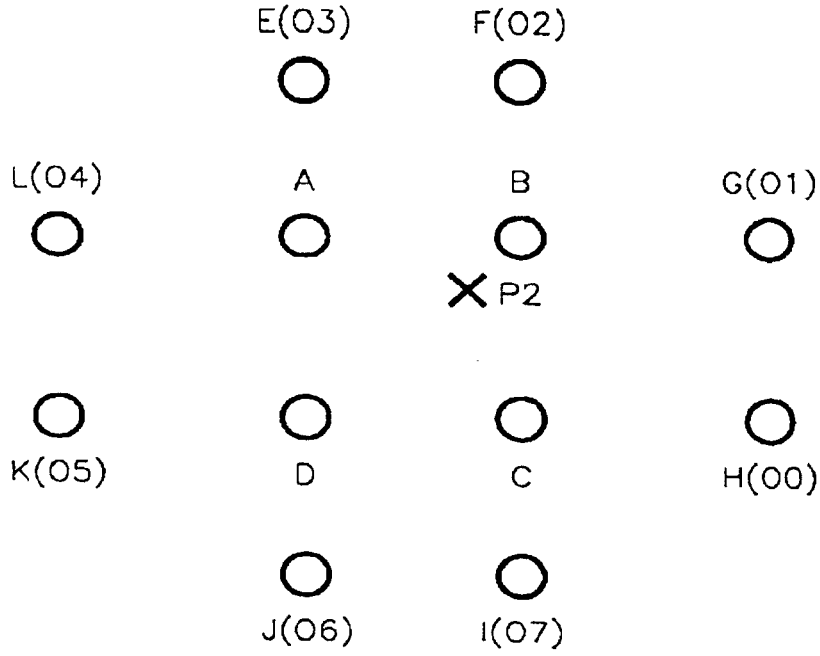
Figure 3C:
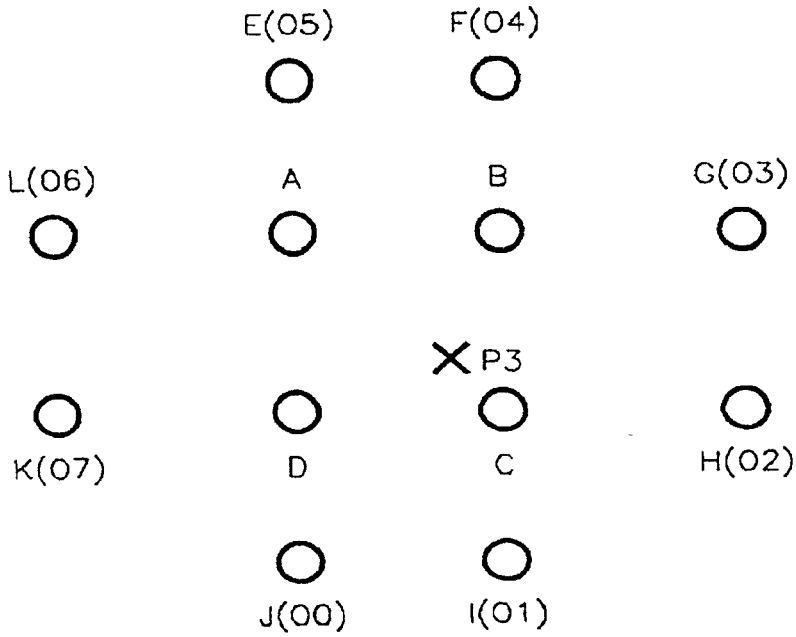
Figure 3D:
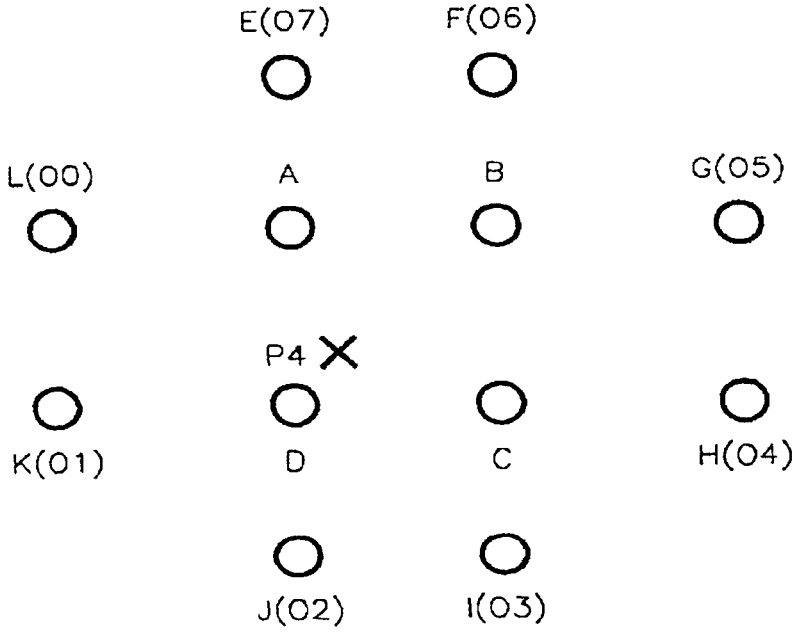

In FIG. 3A, if the context value is "0", the value of reference pixels "FELKJIHG" becomes "00000000". Also, the value of the reference pixels becomes "10000000" and "01000000" if the values of the context are "1" and "2", respectively. Also, if the value of the context is 255, the value of the reference pixels becomes "11111111".

In FIG. 4, reference numerals 400, 402 and 404 represent the threshold values when the context values are 0, 1 and 2, respectively. Also, reference numeral 406 represents the threshold value when the context values is 255. That is, when the context values are 0, 1 and 2, the threshold values are equal to 5, 6 and 6, respectively. Also, when the context value is 255, the threshold value is equal to 14 as indicated by the reference numeral 406.

The interpolation value INP[P] and the threshold value THRc according to the context of the object pixels are a compared to determine a pixel value of the interpolated pixel.

If the interpolation value INP[P] is greater than the threshold value THRc, the pixel value of the interpolated pixel is set to "1". Otherwise, the pixel value of the interpolated pixel is set to "0".

The threshold table used in the present invention is effectively determined in consideration of reference pixel values. The procedure for preparing the threshold table in consideration of the reference pixel values will be described with reference to FIGS. 5 through 7.

1) Possible sums of the reference pixels are calculated.

Here, the sum of the reference pixels represents the sum of pixel values of the reference pixels which contributes to calculate the context. For example, it refers to the sum of the pixel values of the reference pixels indicated by E, F, G, H, I, J, K and L in FIG. 3.

In FIG. 3, since the number of the reference pixels is equal to 8, the possible sum of the reference pixels is one of 0, 1, 2, 3, 4, 5, 6, 7 and 8.

2) Possible interpolation values with respect to the possible sums of the reference pixels are calculated.

FIG. 5A shows the relationship between the sums of the reference pixels and the possible interpolation values. In FIG. 5A, sums of the reference pixels are arranged in the left column according to size while the possible interpolation values on the sums of the reference pixels are arranged in the right column. Here, the weights, r, s and t are 4, 2 and 1, respectively.

For example, if the sum of the reference pixels is equal to "0", that is, all the pixel values of the reference pixels are "0", the interpolation value is one of 0, 2, 4, 6, 8 and 10. If all the pixel values of the adjacent object pixels A, B, C and D are "0", the interpolation value becomes "0". Also, if all the pixel values of the adjacent object pixels A, B, C and C are 37 1", the interpolation value becomes "10".

In the same manner, if the sum of the reference pixels is equal to "8", that is, if all the pixel values of the reference pixels are "1", the interpolation value becomes one of 8, 10, 12, 14, 16 and 18.

3) Possible candidate threshold values with respect to the possible sum of the reference pixels are determined.

FIG. 5B shows the possible threshold values corresponding to the possible interpolation values. In FIG. 5B, the possible candidate threshold values are median values of every adjacent pair of the possible interpolation values arranged by size in FIG. 5B.

4) A threshold value with respect to each context value corresponding to the possible sums of the reference pixels is selected among the possible candidate threshold values. Here, the threshold value may be the median among the possible threshold values.

5) The table is prepared by matching the contexts with the selected threshold values. Here, each context matches with the threshold value with respect to the sum of the corresponding reference pixels.

FIG. 6 shows the threshold values selected from the candidate threshold values of FIG. 5B, corresponding to the median values of the candidate threshold values, according to the possible combinations of the context.

In FIG. 6, reference numerals 600, 602, and 604 represent the threshold values when the context values are 0, 1 and 2, respectively. Also, reference numeral 606 represents the threshold value when the context value is 255. That is, if the context values are equal to 0, 1 and 2, the threshold values become "5", "6" and "6", respectively. Also, if the context value is equal to 255, the threshold value become "13".

If the context value is equal to "0", that is, if the sum of the reference pixels is "0" in FIG. 5A, the candidate threshold values include −1, 1, 3, 5, 7, 9 and 11 as shown in FIG. 5B, and the median among those, i.e., 5, is selected as the threshold value.

If the context value is equal to "1", that is, if the sum of the reference pixels is "1" in FIG. 5A, the candidate threshold values include 0, 2, 4, 6, 8, 10 and 12 as shown in FIG. 5B, and the median among those, i.e., 6, is selected as the threshold value.

If the context value is equal to "2", that is, if the sum of the reference pixels is "2" in FIG. 5A, the candidate threshold values include 1, 4, 5, 7, 9, 11 and 13 as shown in FIG. 5B, and the median among those, i.e., 7, is selected as the threshold value.

If the context value is equal to "255", that is, if the sum of the reference pixels is "8" in FIG. 5A, the candidate threshold values include 7, 9, 11, 13, 15, 17 and 19 as shown in FIG. 5B, and the median among those, i.e., 13, is selected as the threshold value.

Also, FIG. 7 is a threshold table which is obtained in consideration of ±2 variable range on the threshold value of FIG. 6. That is, the threshold values of the ±2 variable range are applied to the actual binary image, and the threshold value showing the least error during the reproduction is then selected.

In the interpolation method of the present invention, the ambiguity in the comparison between the interpolation value and the threshold value is removed by using the state value (context) of the reference pixels around the interpolated pixel, thereby reducing the blocking and smoothing phenomena in the restored binary image.

The invention may be embodied in a general purpose digital computer that is running a program or program segments originating from a computer readable or usable medium, such medium including but not limited to magnetic storage media ((e.g., ROM's, floppy disks, hard disks, etc.), optically readable media (e.g., CD-ROMs, DVDs, etc.) and carrier waves (e.g., transmissions over the Internet). A functional program, code and code segments, used to implement the present invention can be derived by a skilled computer programmer from the description of the invention contained herein.

Figure 8A:
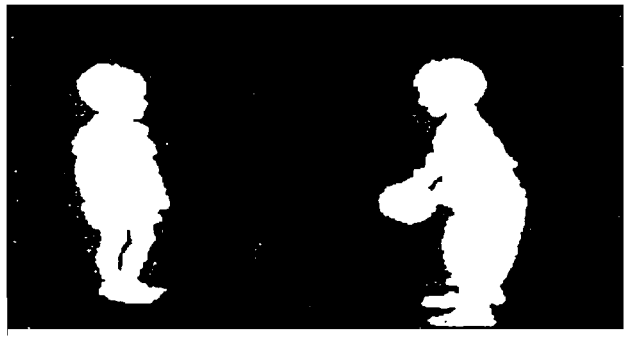
FIGS. 8A through 8C show the effect of the interpolation method according to the present invention, compared to the conventional method.
Figure 8B:
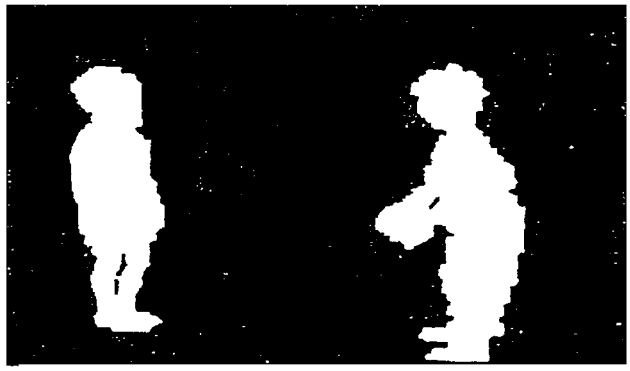
FIG. 8B (PRIOR ART)
Figure 8C:
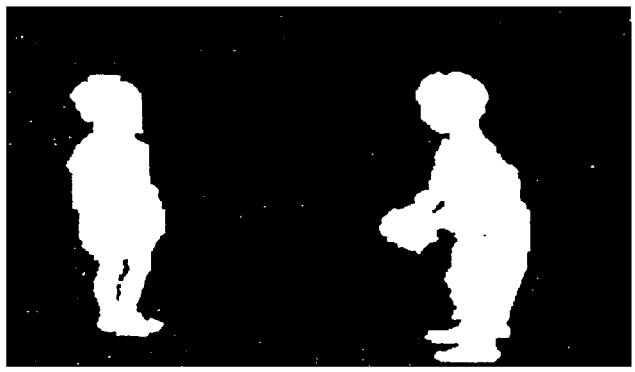

FIGS. 8A through 8C show the effect of the interpolation method according to the present invention, in contrast to the conventional method. In detail, FIG. 8A shows the original binary image, FIG. 8B shows the result of the conventional bilinear interpolation, and FIG. 8C shows the result of the interpolation according to the present invention.

As can be seen from FIGS. 8B and 8C, the blocking effect is sharply reduced compared to the conventional bilinear interpolation method.

As described above, in the interpolation method of the present invention, the ambiguity in the comparison between the interpolation value and the threshold value is removed by using the state value (context) of the reference pixels around the interpolated pixel, thereby reducing the blocking and smoothing phenomena in the restored binary image.

In the interpolation method of the present invention, since variable threshold values according to the context combination are quickly obtained from the threshold table, the interpolation can be performed rapidly.

What is claimed is:

1. A computer usable medium having embodied thereon a computer program for restoring a binary image block reduced through a down sampling into the block with the size of the original binary image block, the computer program being executable by a machine to perform:

(a) preparing a threshold table showing various threshold values corresponding to a context $C_p$ (state value) of pixels (reference pixels) of the reduced image, around an interpolated pixel;

(b) calculating an interpolation value based on the pixel values of pixels (object pixels) adjacent to and/or around the interpolated pixel;

(c) calculating the context $C_p$ which is the state value of the reference pixels around the interpolated pixel;

(d) obtaining a threshold value corresponding to the calculated context from the threshold table; and (e) comparing the interpolation value with the threshold value of the step (d), and setting the pixel value of the interpolated pixel as "1" if the interpolation value is greater than the threshold value, and setting the pixel value of the interpolated pixel as "0" if the interpolation value is equal to or less than the threshold value.

2. The computer usable medium of claim 1, wherein the computer program at (b) calculates by an interpolation method using the following equations:

$$INP[P1]=r*A+s*(B+C+D)+t*(E+F+G+H+I+J+K+L)$$

$$INP[P2]=r*B+s*(A+C+D)+t*(E+F+G+H+I+J+K+L)$$

$$INP[P3]=r*C+s*(A+B+D)+t*(E+F+G+H+I+J+K+L)$$

$$INP[P4]=r*D+s*(A+B+C)+t*(E+F+G+H+I+J+K+L)$$

where P1, P2, P3 and P4 represent an interpolated pixel, A, B, C and D are the objective pixels adjacent to the interpolated pixel, E, F, G, H, I, J, K and L are the objective pixels around the pixels A, B, C and D, INP[P] represents the interpolation value of the interpolated pixel P, r is the weight of the object pixel which is the closest to the interpolated pixel, s is the weight of three object pixels which are the next closest to the interpolated pixel, and t is the weight of eight object pixels around the next closest pixels, and the condition of r>s>t is satisfied.

3. The computer usable medium of claim 1, wherein the computer program at (c) is performed using the following equation:

$$C_p = \sum_{0}^{k} O_k \cdot 2^k$$

where P represents the position of the interpolated pixel, O represents the reference pixel, and k is an index of the reference pixels.

4. The computer usable medium of claim 3, wherein the index k of the computer program at (c) is varied according to the location of the interpolated pixels with respect to the adjacent pixels.

5. The computer usable medium of claim 1, wherein the computer program at (a) preforms:

(a1) calculating possible sums of the reference pixels;

(a2) calculating possible interpolation values with respect to the possible sums of the reference pixels;

(a3) setting possible candidate threshold values with respect to the possible sum of the reference pixels; and (a4) selecting a threshold value from the candidate threshold values with respect to each context corresponding to the possible sum of the reference pixels, resulting in the threshold table.

6. The computer usable medium of claim 5, wherein the candidate threshold values of the computer program at (a3) are the median values of every adjacent pair of the possible interpolation values which are arranged in size.

7. The computer usable medium of claim 5, wherein the computer program at (a4) selects the median values of the candidate threshold values with respect to each context as the threshold value.

8. The computer usable medium of claim 7, wherein the computer program being further executable by a machine to perform adjusting the threshold values of the table by allowing a predetermined variable range for the selected threshold values and then selecting a threshold value with respect to each context, showing the least error in reproduction when the threshold values are applied to an actual binary image.

*9. An apparatus comprising:*

*(a) means for preparing a threshold table showing various threshold values corresponding to a context $C_p$ (state value) of pixels (reference pixels) of the reduced image, around an interpolated pixel;*

*(b) means for calculating an interpolation value based on the pixel values of pixels (object pixels) adjacent to and/or around the interpolated pixel;*

*(c) means for calculating the context $C_p$ which is the state value of the reference pixels around the interpolated pixel;*

*(d) means for obtaining a threshold value corresponding to the calculated context from the threshold table; and*

*(e) means for comparing the interpolation value with the threshold value of the step (d), and setting the pixel value of the interpolated pixel as "1" if the interpolation value is greater than the threshold value, and setting the pixel value of the interpolated pixel as "0" if the interpolation value is equal to or less than the threshold value.*

*10. The apparatus of claim 9, wherein the interpolation calculating means calculates by an interpolation method using the following equations:*

$$INP[P1]=r*A+s*(B+C+D)+t*(E+F+G+H+I+J+K+L)$$

$$INP[P2]=r*B+s*(A+C+D)+t*(E+F+G+H+I+J+K+L)$$

$$INP[P3]=r*C+s*(A+B+D)+t*(E+F+G+H+I+J+K+L)$$

$$INP[P4]=r*D+s*(A+B+C)+t*(E+F+G+H+I+J+K+L)$$

*where P1, P2, P3 and P4 represent an interpolated pixel, A, B, C and D are the objective pixels adjacent to the interpolated pixel, E, F, G, H, I, J, K and L are the objective pixels around the pixels A, B, C and D, INP[P] represents the interpolation value of the interpolated pixel P, r is the weight of the object pixel which is the closest to the interpolated pixel, s is the weight of three object pixels which are the next closest to the interpolated pixel, and t is the weight of eight object pixels around the next closest pixels, and the condition of r>s>t is satisfied.*

*11. The apparatus of claim 9, wherein the context calculating means is performed using the following equation:*

$$C_p = \sum_{0}^{k} C_k \cdot 2^k$$

*where P represents the position of the interpolated pixel, O represents the reference pixel, and k is an index of the reference pixels.*

*12. The apparatus of claim 11, wherein the index k used in the context calculating means is varied according to the location of the interpolated pixels with respect to the adjacent pixels.*

*13. The apparatus of claim 9, wherein the threshold table preparing means includes:*

*(a1) means for calculating possible sums of the reference pixels;*

*(a2) means for calculating possible interpolation values with respect to the possible sums of the reference pixels;*

*(a3) means for setting possible candidate threshold values with respect to the possible sum of the reference pixels; and*

*(a4) means for selecting a threshold value from the candidate threshold values with respect to each context corresponding to the possible sum of the reference pixels, resulting in the threshold table.*

*14. The apparatus of claim 13, wherein the candidate threshold values set by the possible candidate threshold value setting means are the median values of every adjacent pair of the possible interpolation values which are arranged in size.*

*15. The apparatus of claim 13, wherein the threshold value selecting means selects the median values of the candidate threshold values with respect to each context as the threshold value.*

*16. The apparatus of claim 15, further comprising means for adjusting the threshold values of the table by allowing a predetermined variable range for the selected threshold values and then selecting a threshold value with respect to each context, showing the least error in reproduction when the threshold values are applied to an actual binary image.*

* * * * *